United States Patent
Shen (10) Patent No.: US 10,412,605 B2
(45) Date of Patent: Sep. 10, 2019

(54) SELF-ADAPTIVE BLUETOOTH PERFORMANCE ADJUSTMENT COMMUNICATION TERMINAL AND METHOD

(71) Applicant: ZTE CORPORATION, Shenzhen, Guangdong Province (CN)

(72) Inventor: Shaowu Shen, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 15/741,496

(22) PCT Filed: Oct. 15, 2015

(86) PCT No.: PCT/CN2015/092046
§ 371 (c)(1),
(2) Date: Jan. 2, 2018

(87) PCT Pub. No.: WO2017/004907
PCT Pub. Date: Jan. 12, 2017

(65) Prior Publication Data
US 2018/0199214 A1  Jul. 12, 2018

(30) Foreign Application Priority Data

Jul. 3, 2015  (CN) .......................... 2015 1 0390827

(51) Int. Cl.
*H04W 24/02* (2009.01)
*H04W 4/80* (2018.01)
*H04W 88/02* (2009.01)

(52) U.S. Cl.
CPC ............. *H04W 24/02* (2013.01); *H04W 4/80* (2018.02); *H04W 88/02* (2013.01)

(58) Field of Classification Search
CPC .................................................... H04W 24/02
See application file for complete search history.

(56) References Cited

U.S. PATENT DOCUMENTS

| 2003/0139136 | A1* | 7/2003 | Pattabiraman | ......... H04B 1/715 455/41.1 |
| 2004/0063403 | A1* | 4/2004 | Durrant | ................. H04W 24/00 455/41.2 |

(Continued)

FOREIGN PATENT DOCUMENTS

| CN | 102150450 | 8/2011 |
| CN | 103581966 | 2/2014 |

(Continued)

OTHER PUBLICATIONS

European Search Report for Application No. EP 15897563.1; dated Aug. 6, 2018.

*Primary Examiner* — Hsinchun Liao
(74) *Attorney, Agent, or Firm* — Ferguson Case Orr Paterson LLP (57) ABSTRACT

Disclosed are a self-adaptive Bluetooth performance adjustment communication device and method. The device includes: a detection unit is configured to detect state parameters in various Bluetooth application environments and a target requirement of the current terminal user; the self-adaptive control unit is configured to obtain target adjustment parameters corresponding to associated Bluetooth parameters expected to be adjusted, and control initiation of an adjustment unit; and the adjustment unit is configured to perform optimization adjustment until the Bluetooth performance of a terminal achieves an expected working state.

11 Claims, 2 Drawing Sheets

(56) References Cited

U.S. PATENT DOCUMENTS

| | | |
|---|---|---|
| 2011/0151863 A1 | 6/2011 | Shaw et al. |
| 2012/0207032 A1 | 8/2012 | Chen et al. |
| 2014/0169795 A1* | 6/2014 | Clough ............... G06F 19/3418 398/106 |
| 2014/0315592 A1 | 10/2014 | Schlub |
| 2014/0359042 A1* | 12/2014 | Fenley ............... H04L 12/6418 709/208 |

FOREIGN PATENT DOCUMENTS

| | | |
|---|---|---|
| EP | 1838040 A2 | 9/2007 |
| EP | 1838040 A3 | 9/2010 |
| EP | 2486745 A2 | 8/2012 |
| WO | WO 2014/168249 A1 | 10/2014 |

* cited by examiner

SELF-ADAPTIVE BLUETOOTH PERFORMANCE ADJUSTMENT COMMUNICATION TERMINAL AND METHOD

TECHNICAL FIELD

The present disclosure relates to a technique of Bluetooth performance adjustment, and more particularly to a self-adaptive Bluetooth performance adjustment communication terminal and method.

BACKGROUND

Bluetooth is a novel short-distance wireless connection technology that is open, low in cost, low in power consumption, and capable of replacing a short-distance cable and achieving wireless voice and data transmission. As Bluetooth equipment in a mobile phone is applied more and more widely, a Bluetooth standard is upgraded continuously from V1.0 to V4.1, Bluetooth is applied from a mobile phone terminal to interconnection of wearable equipment, the internet of things and automotive electronics, requirements of industry and users for Bluetooth performance are increasingly high, and particularly, requirements of customers for Bluetooth applicability to multiple application scenarios are increasingly high. The magnitude of Bluetooth performance is a very important index of a high-end mobile phone, which influences the performance of the whole phone and determines success or failure of a product.

Factors influencing the Bluetooth performance include the following several contents.

1. The influence of a maximum transmitting power supportable by Bluetooth on the performance of a transmission distance is large; in a traditional solution, due to limitations of a Bluetooth power class set by software, for example, a maximum transmitting power range of −6 dB to 4 dB under the limit of CLASS2, a software code default power is about 0 dB, and this transmitting power is fixed and cannot be adjusted; and in case of increase of the loss of a radio frequency front end or antenna sharing, attenuation of power from a Bluetooth chip to an antenna front end will be further increased, so the radiation power of Bluetooth will be greatly reduced. Therefore, a maximum linear transmission distance of Bluetooth is limited to be within a range of 10 m, and that is why Bluetooth transmission will be interrupted out of a range of 10 m or in the presence of an obstacle or a phenomenon of sound lag occurs.

2. An ISM band used by Bluetooth is a band open to all radio systems, a frequency range is 2402 to 2480 MHz, and Bluetooth will encounter various interference sources, so Bluetooth adopts a rapid packet acknowledgment technology and a frequency hopping solution to ensure stability of a link and a channel. There are 79 or 39 physical channels of Bluetooth generally, in a transmission process, random hopping is performed on these radio frequency channels via a pseudorandom sequence, and the sensitivity of each channel is different more or less, so if Bluetooth hops to a channel which has a weak signal or is prone to interference, the voice stability and transmission rate of a Bluetooth connecting terminal will be influenced.

3. When a Bluetooth earphone is connected to a mobile phone, if the mobile phone or the earphone is close to a body or a person is in a non-stationary state, such as walking, exercising and turning, due to the influence of antenna directionality, Bluetooth audio transmission may cause an obvious lag phenomenon. Meanwhile, due to a body effect, the Bluetooth earphone is put in a left ear or a right ear, the mobile phone is put on the same or opposite side of the body, and antenna gains and efficiency will be changed under the influence of body absorption, thereby influencing the quality of call voice or audio transmission.

4. When the Bluetooth of the mobile phone is used, an external Wireless Fidelity (WIFI) and Long Term Evolution (LTE) signal stray interference within a same-frequency range exists or Bluetooth will cause an obvious lag phenomenon when an own WIFI and LTE of the mobile phone are initiated, thereby influencing the quality of call voice or audio transmission.

To sum up, any one of the above factors would influence the performance of Bluetooth transmission. However, any effective solution has not been proposed yet in the related art to avoid the influence of any one of the above factors so as to adjust Bluetooth performance to achieve a good communication state.

SUMMARY

In view of this, embodiments of the prevent disclosure are intended to provide a self-adaptive Bluetooth performance adjustment communication terminal and method, which at least solves the problems in the related art and can avoid bad influences caused by any one of the above factors so as to adjust Bluetooth performance to achieve a good communication state.

The technical solutions in the embodiments of the present disclosure are implemented as follows.

A self-adaptive Bluetooth performance adjustment communication terminal in the embodiment of the present disclosure includes:

a detection unit, configured to detect state parameters in various Bluetooth application environments and a target requirement of a current terminal user when a Bluetooth communication transmission of the terminal is turned on, obtain a detection result and send the detection result to a self-adaptive control unit;

the self-adaptive control unit, configured to receive and analyze the detection result to obtain the state parameters and the target requirement, obtain, according to the state parameters and the target requirement, target adjustment parameters corresponding to associated Bluetooth parameters expected to be adjusted, control initiation of an adjustment unit, and send, according to a first preset rule, the target adjustment parameters to the adjustment unit for processing; and the adjustment unit, configured to receive the target adjustment parameters, and perform, according to the target adjustment parameters, optimization adjustment until the Bluetooth performance of a terminal achieves an expected working state.

In an embodiment, the expected working state is used for representing: supporting the terminal to enable the Bluetooth communication transmission to be always in an optimum working state in various application environments, communication states and user individual requirements via different performance adjustments, so as to reduce a phenomenon of lag or interruption in a remote obstructed dynamic application environment.

In an embodiment, the detection unit further includes: an application detection module, configured to detect a Bluetooth application environment of the current terminal user, complete detection on requirements for a terminal wireless communication system, a communication mode and a terminal user mode, send an obtained detection result to the self-adaptive control unit, and then provide the detection result for a corresponding adjustment module to realize corresponding adjustment, so as to obtain a corresponding channel avoidance result.

In an embodiment, the detection unit also includes: a channel detection module, configured to detect a channel quality state of current terminal Bluetooth and a channel occupancy situation within an external same-frequency and adjacent-frequency range, send an obtained detection result to the self-adaptive control unit, and then provide the detection result for a corresponding adjustment module to realize corresponding adjustment, so as to obtain a corresponding channel avoidance result.

In an embodiment, the detection unit also includes: a user interaction module, configured to receive an associated wireless setting and request of a user, support the user to set a mode corresponding to the Bluetooth application environment and a target requirement of a current terminal user to generate a control instruction, send the control instruction to the self-adaptive control unit, and then provide the control instruction for a corresponding adjustment module to realize corresponding adjustment, so as to obtain a corresponding expected working state.

In an embodiment, the detection unit also includes: a body effect detection module, configured to sense the influence on a body effect caused by a current terminal Bluetooth antenna, send an obtained sensing result to the self-adaptive control unit, and then provide the sensing result for a corresponding adjustment module to realize corresponding adjustment, so as to obtain a result of reducing the influence on the body effect.

In an embodiment, the adjustment unit further includes: an antenna switching and adjustment module, configured to acquire at least one output result output by the application detection module, the channel detection module, the user interaction module and the body effect detection module, perform, when acquiring a sensing result output by the body effect detection module, real-time switching and matching adjustment by judging a current antenna contact location and attenuation according to the sensing result to reduce a body antenna effect, and switch a Bluetooth antenna to a location away from a body contact part.

In an embodiment, the adjustment unit further includes: a power adjustment module, configured to acquire at least one output result output by the application detection module, the channel detection module, the user interaction module and the body effect detection module, and achieve power digital type calling and multi-stage variable adjustment under different requirements in various Bluetooth application environments in conjunction with influence of three indexes namely transmission distance, power consumption and body radiation.

In an embodiment, the adjustment unit further includes: a channel selection and avoidance module, configured to acquire at least one output result output by the application detection module, the channel detection module, the user interaction module and the body effect detection module, and achieve, when acquiring a detection result output by the channel detection module, selection and avoidance of a Bluetooth communication channel according to the detection result and an anti-interference algorithm, such that Bluetooth communication transmission is always performed on a small-interference and high-communication quality channel.

In an embodiment, the adjustment unit further includes: a coexistence adjustment module, configured to acquire at least one output result output by the application detection module, the channel detection module, the user interaction module and the body effect detection module, and optimize a coexistence performance between Bluetooth and other equipment according to a current Bluetooth application scenario and a target requirement, so as to preferentially ensure the communication quality of Bluetooth.

When the detection unit, the self-adaptive control unit, the adjustment unit, the application detection module, the channel detection module, the user interaction module, the body effect detection module, the antenna switching and adjustment module, the power adjustment module, the channel selection and avoidance module and the coexistence adjustment module executes processing, processing may be implemented by adopting a Central Processing Unit (CPU), a Digital Signal Processor (DSP) or a Field-Programmable Gate Array (FPGA).

The embodiment of the present disclosure discloses a self-adaptive Bluetooth performance adjustment communication method. The method is applied to the communication terminal as mentioned above in any one of the solutions. The method includes the steps as follows.

when a Bluetooth communication transmission of the terminal is turned on, the state parameters in various Bluetooth application environments of a current terminal user and the target requirement of the current terminal user are detected to obtain a detection result, and the detection result is sent to a self-adaptive control unit.

The detection result is received and analyzed to obtain the state parameters and the target requirement, target adjustment parameters corresponding to associated Bluetooth parameters expected to be adjusted are obtained according to the state parameters and the target requirement, initiation of an adjustment unit is controlled, and the target adjustment parameters are sent to the adjustment unit for processing according to a first preset rule.

The target adjustment parameters are received, and optimization adjustment is performed according to the target adjustment parameters until the Bluetooth performance of a terminal achieves an expected working state.

In an embodiment, the step that state parameters in various Bluetooth application environments of a current terminal user, when turning on Bluetooth communication transmission, and a target requirement of the current terminal user are detected to obtain a detection result, and the detection result is sent to a self-adaptive control unit includes the sub-steps as follows.

An associated wireless setting and request of a user are received via a user interaction module, and the user is supported to set a mode corresponding to a Bluetooth application environment and a target requirement of a current terminal user, so as to generate a control instruction.

A self-adaptive control module and an application detection module are initiated, the self-adaptive control module receives the control instruction, and the application detection module is triggered to detect a current wireless and cellular mode initiation situation, external band interference information, a mobile phone power transmitting value and a body effect, so as to be fed back to the self-adaptive control module.

In an embodiment, the step that the target adjustment parameters are received and optimization adjustment is performed according to the target adjustment parameters until the Bluetooth performance of a terminal achieves an expected working state includes the sub-steps as follows.

At least one output result output by the application detection module, a channel detection module, a user interaction module and a body effect detection module is acquired, and when it is discovered that Bluetooth power control is at an upper limit of a maximum transmitting power threshold and there is a transmission lag, the self-adaptive control module initiates a power adjustment module.

The power adjustment module selects, according to a current power value and a user interaction setting, an appropriate power class, and transmits a power target value.

The power adjustment module compares a signal and audio value actually sampled by a Bluetooth chip and a baseband chip with the target value, and feeds a comparison result back to the self-adaptive control module, so as to achieve closed-loop feedback control adjustment until Bluetooth data or audio is transmitted smoothly.

In an embodiment, the step that the target adjustment parameters are received and optimization adjustment is performed according to the target adjustment parameters until the Bluetooth performance of a terminal achieves an expected working state includes the sub-steps as follows.

At least one output result output by the application detection module, the channel detection module, the user interaction module and the body effect detection module is acquired, and when it is detected that there is a co-channel interference in a current environment, a channel selection and avoidance module is initiated.

The channel selection and avoidance module selects a clear channel range to perform frequency hopping, and avoids an interference channel.

A signal and audio value actually sampled by the Bluetooth chip and the baseband chip is compared with the power target value, and a comparison result is fed back to the self-adaptive control module, so as to achieve closed-loop feedback control adjustment until Bluetooth data or audio is transmitted smoothly.

In an embodiment, the step that the target adjustment parameters are received and optimization adjustment is performed according to the target adjustment parameters until the Bluetooth performance of a terminal achieves an expected working state includes the sub-steps as follows.

At least one output result output by the application detection module, the channel detection module, the user interaction module and the body effect detection module is acquired, and when the body effect detection module detects that there is an obvious body effect resulting in electromagnetic absorption and attenuation, it is judged whether the influence is static or dynamic, so as to obtain a judgment result.

When the judgment result indicates that the influence is static, the self-adaptive control module controls an antenna switching and adjustment module to switch a Bluetooth antenna to a location away from a body contact part, and then performs real-time matching fine adjustment and same-amplitude attenuated power compensation.

A signal and audio value actually sampled by the Bluetooth chip and the baseband chip is compared with the power target value, and a comparison result is fed back to the self-adaptive control module, so as to achieve closed-loop feedback control adjustment until Bluetooth data or audio is transmitted smoothly.

In an embodiment, the step that the target adjustment parameters are received and optimization adjustment is performed according to the target adjustment parameters until the Bluetooth performance of a terminal achieves an expected working state includes the sub-steps as follows.

At least one output result output by the application detection module, the channel detection module, the user interaction module and the body effect detection module is acquired, and when the body effect detection module detects that there is an obvious body effect resulting in electromagnetic absorption and attenuation, it is judged whether the influence is static or dynamic, so as to obtain a judgment result.

When the judgment result indicates that the influence is dynamic, the self-adaptive control module calls a mean power attenuation value under a corresponding motion form to perform same-amplitude attenuation compensation, and controls a delay buffer module to buffer and smooth a transmission signal, so as to prevent lag.

A signal and audio value actually sampled by the Bluetooth chip and the baseband chip is compared with the power target value, and a comparison result is fed back to the self-adaptive control module, so as to achieve closed-loop feedback control adjustment until Bluetooth data or audio is transmitted smoothly.

In an embodiment, the step that the target adjustment parameters are received and optimization adjustment is performed according to the target adjustment parameters until the Bluetooth performance of a terminal achieves an expected working state includes the sub-steps as follows.

At least one output result output by the application detection module, the channel detection module, the user interaction module and the body effect detection module is acquired, and if it is detected that Bluetooth lag or interruption is caused by an inevitable signal interference near 2.4 GHz, the self-adaptive control module initiates a coexistence adjustment module.

The coexistence adjustment module determines the using situation of current other ISM band equipment according to a detection result of the application detection module, initiates narrowband filter and antenna passage adjustment of a corresponding band, and performs corresponding adjustment control on an own frequency hopping channel of Bluetooth, a maximum transmitting power and a working time slot, so as to reduce the coexistence influence.

A signal and audio value actually sampled by the Bluetooth chip and the baseband chip is compared with the power target value, and a comparison result is fed back to the self-adaptive control module, so as to achieve closed-loop feedback control adjustment until Bluetooth data or audio is transmitted smoothly.

The self-adaptive Bluetooth performance adjustment communication terminal in the embodiment of the present disclosure includes: a detection unit, configured to detect state parameters in various Bluetooth application environments of a current terminal user, when turning on Bluetooth communication transmission, and a target requirement of the current terminal user to obtain a detection result, and send the detection result to a self-adaptive control unit; the self-adaptive control unit, configured to receive and analyze the detection result to obtain the state parameters and the target requirement, obtain, according to the state parameters and the target requirement, target adjustment parameters corresponding to associated Bluetooth parameters expected to be adjusted, control initiation of an adjustment unit, and send, according to a first preset rule, the target adjustment parameters to the adjustment unit for processing; and the adjustment unit, configured to receive the target adjustment parameters, and perform, according to the target adjustment parameters, optimization adjustment until the Bluetooth performance of a terminal achieves an expected working state.

By means of the embodiments of the prevent disclosure, state parameters in various Bluetooth application environments of a current terminal user, when turning on Bluetooth communication transmission, and a target requirement of the current terminal user are obtained via a detection unit, and a self-adaptive control unit receives the state parameters in various Bluetooth application environments and the target requirement of the current terminal user, and controls an adjustment unit to perform adjustment, such that the adjustment unit performs optimization adjustment according to received target adjustment parameters until the Bluetooth performance of a terminal achieves an expected working state. Bad influences caused by any one of the above factors can be avoided, so as to adjust Bluetooth performance to achieve a good communication state.

DETAILED DESCRIPTION OF THE EMBODIMENTS

The implementation of the technical solutions will be further described in detail below with the drawings.

A self-adaptive Bluetooth performance adjustment communication terminal in the embodiment of the present disclosure includes a detection unit, a self-adaptive control unit, and an adjustment unit.

The detection unit is configured to detect state parameters in various Bluetooth application environments of a current terminal user, when turning on Bluetooth communication transmission, and to detect a target requirement of the current terminal user. Then the detection unit obtains a detection result, and sends the detection result to a self-adaptive control unit.

The self-adaptive control unit is configured to receive and to analyze the detection result for obtaining the state parameters and the target requirement. The self-adaptive control unit is further configured to obtain, according to the state parameters and the target requirement, target adjustment parameters corresponding to associated Bluetooth parameters expected to be adjusted. The self-adaptive control unit is further configured to control initiation of an adjustment unit, and further to send, according to a first preset rule, the target adjustment parameters to the adjustment unit for processing.

The adjustment unit is configured to receive the target adjustment parameters, and perform, according to the target adjustment parameters, optimization adjustment until the Bluetooth performance of a terminal achieves an expected working state.

In an implementation manner of the embodiment of the present disclosure, the expected working state is used for representing: supporting the terminal to enable the Bluetooth communication transmission to be always in an optimum working state in various application environments, communication states and user individual requirements via different performance adjustments, so as to reduce a phenomenon of lag or interruption in a remote obstructed dynamic application environment.

In an implementation manner of the embodiment of the present disclosure, the detection unit further includes:

an application detection module, configured to detect a Bluetooth application environment of the current terminal user, complete detection on requirements for a terminal wireless communication system, a communication mode and a terminal user mode, send an obtained detection result to the self-adaptive control unit, and then provide the detection result for a corresponding adjustment module to realize corresponding adjustment, so as to obtain a corresponding channel avoidance result.

In an implementation manner of the embodiment of the present disclosure, the detection unit also includes a channel detection module.

the channel detection module is configured to detect a channel quality state of current terminal Bluetooth and a channel occupancy situation within an external same-frequency and adjacent-frequency range, send an obtained detection result to the self-adaptive control unit, and then provide the detection result for a corresponding adjustment module to realize corresponding adjustment, so as to obtain a corresponding channel avoidance result.

In an implementation manner of the embodiment of the present disclosure, the detection unit also includes a user interaction module.

the user interaction module is configured to receive an associated wireless setting and request of a user, support the user to set a mode corresponding to the Bluetooth application environment and a target requirement of a current terminal user to generate a control instruction, send the control instruction to the self-adaptive control unit, and then provide the control instruction for a corresponding adjustment module to realize corresponding adjustment, so as to obtain a corresponding expected working state.

In an implementation manner of the embodiment of the present disclosure, the detection unit also includes: a body effect detection module, configured to sense the influence on a body effect caused by a current terminal Bluetooth antenna, send an obtained sensing result to the self-adaptive control unit, and then provide the sensing result for a corresponding adjustment module to realize corresponding adjustment, so as to obtain a result of reducing the influence on the body effect.

In an implementation manner of the embodiment of the present disclosure, the adjustment unit further includes: an antenna switching and adjustment module, configured to acquire at least one output result output by the application detection module, the channel detection module, the user interaction module and the body effect detection module, perform, when acquiring a sensing result output by the body effect detection module, real-time switching and matching adjustment by judging a current antenna contact location and attenuation according to the sensing result to reduce a body antenna effect, and switch a Bluetooth antenna to a location away from a body contact part.

In an implementation manner of the embodiment of the present disclosure, the adjustment unit further includes: a power adjustment module, configured to acquire at least one output result output by the application detection module, the channel detection module, the user interaction module and the body effect detection module, and achieve power digital type calling and multi-stage variable adjustment under different requirements in various Bluetooth application environments in conjunction with influence of three indexes namely transmission distance, power consumption and body radiation.

In an implementation manner of the embodiment of the present disclosure, the adjustment unit further includes: a channel selection and avoidance module, configured to acquire at least one output result output by the application detection module, the channel detection module, the user interaction module and the body effect detection module, and achieve, when acquiring a detection result output by the channel detection module, selection and avoidance of a Bluetooth communication channel according to the detection result and an anti-interference algorithm, such that Bluetooth communication transmission is always performed on a small-interference and high-communication quality channel.

In an implementation manner of the embodiment of the present disclosure, the adjustment unit further includes: a coexistence adjustment module, configured to acquire at least one output result output by the application detection module, the channel detection module, the user interaction module and the body effect detection module, and optimize a coexistence performance between Bluetooth and other equipment according to a current Bluetooth application scenario and a target requirement, so as to preferentially ensure the communication quality of Bluetooth.

A self-adaptive Bluetooth performance adjustment communication method is provided in the embodiment of the present disclosure. The method is applied to the communication terminal as mentioned above in any one of the solutions. The method includes the steps as follows.

State parameters in various Bluetooth application environments of a current terminal user, when turning on Bluetooth communication transmission, and a target requirement of the current terminal user are detected to obtain a detection result, and the detection result is sent to a self-adaptive control unit.

The detection result is received and analyzed to obtain the state parameters and the target requirement, target adjustment parameters corresponding to associated Bluetooth parameters expected to be adjusted are obtained according to the state parameters and the target requirement, initiation of an adjustment unit is controlled, and the target adjustment parameters are sent to the adjustment unit for processing according to a first preset rule.

The target adjustment parameters are received, and optimization adjustment is performed according to the target adjustment parameters until the Bluetooth performance of a terminal achieves an expected working state.

In an implementation manner of the embodiment of the present disclosure, the step that state parameters in various Bluetooth application environments of a current terminal user, when turning on Bluetooth communication transmission, and a target requirement of the current terminal user are detected to obtain a detection result, and the detection result is sent to a self-adaptive control unit includes the sub-steps as follows.

An associated wireless setting and request of a user are received via a user interaction module, and the user is supported to set a mode corresponding to a Bluetooth application environment and a target requirement of a current terminal user, so as to generate a control instruction.

A self-adaptive control module and an application detection module are initiated, the self-adaptive control module receives the control instruction, and the application detection module is triggered to detect a current wireless and cellular mode initiation situation, external band interference information, a mobile phone power transmitting value and a body effect, so as to be fed back to the self-adaptive control module.

In an implementation manner of the embodiment of the present disclosure, the step that the target adjustment parameters are received and optimization adjustment is performed according to the target adjustment parameters until the Bluetooth performance of a terminal achieves an expected working state includes the sub-steps as follows.

At least one output result output by the application detection module, a channel detection module, a user interaction module and a body effect detection module is acquired, and when it is discovered that Bluetooth power control is at an upper limit of a maximum transmitting power threshold and there is a transmission lag, the self-adaptive control module initiates a power adjustment module.

The power adjustment module selects, according to a current power value and a user interaction setting, an appropriate power class, and transmits a power target value.

The power adjustment module compares a signal and audio value actually sampled by a Bluetooth chip and a baseband chip with the target value, and feeds a comparison result back to the self-adaptive control module, so as to achieve closed-loop feedback control adjustment until Bluetooth data or audio is transmitted smoothly.

In an implementation manner of the embodiment of the present disclosure, the step that the target adjustment parameters are received and optimization adjustment is performed according to the target adjustment parameters until the Bluetooth performance of a terminal achieves an expected working state includes the sub-steps as follows.

At least one output result output by the application detection module, the channel detection module, the user interaction module and the body effect detection module is acquired, and when it is detected that there is a co-channel interference in a current environment, a channel selection and avoidance module is initiated.

The channel selection and avoidance module selects a clear channel range to perform frequency hopping, and avoids an interference channel.

A signal and audio value actually sampled by the Bluetooth chip and the baseband chip is compared with the power target value, and a comparison result is fed back to the self-adaptive control module, so as to achieve closed-loop feedback control adjustment until Bluetooth data or audio is transmitted smoothly.

In an implementation manner of the embodiment of the present disclosure, the step that the target adjustment parameters are received and optimization adjustment is performed according to the target adjustment parameters until the Bluetooth performance of a terminal achieves an expected working state includes the sub-steps as follows.

At least one output result output by the application detection module, the channel detection module, the user interaction module and the body effect detection module is acquired, and when the body effect detection module detects that there is an obvious body effect resulting in electromagnetic absorption and attenuation, it is judged whether the influence is static or dynamic, so as to obtain a judgment result.

When the judgment result indicates that the influence is static, the self-adaptive control module controls an antenna switching and adjustment module to switch a Bluetooth antenna to a location away from a body contact part, and then performs real-time matching fine adjustment and same-amplitude attenuated power compensation.

A signal and audio value actually sampled by the Bluetooth chip and the baseband chip is compared with the power target value, and a comparison result is fed back to the self-adaptive control module, so as to achieve closed-loop feedback control adjustment until Bluetooth data or audio is transmitted smoothly.

In an implementation manner of the embodiment of the present disclosure, the step that the target adjustment parameters are received and optimization adjustment is performed according to the target adjustment parameters until the Bluetooth performance of a terminal achieves an expected working state includes the sub-steps as follows.

At least one output result output by the application detection module, the channel detection module, the user interaction module and the body effect detection module is acquired, and when the body effect detection module detects that there is an obvious body effect resulting in electromagnetic absorption and attenuation, it is judged whether the influence is static or dynamic, so as to obtain a judgment result.

When the judgment result indicates that the influence is dynamic, the self-adaptive control module calls a mean power attenuation value under a corresponding motion form to perform same-amplitude attenuation compensation, and controls a delay buffer module to buffer and smooth a transmission signal, so as to prevent lag.

A signal and audio value actually sampled by the Bluetooth chip and the baseband chip is compared with the power target value, and a comparison result is fed back to the self-adaptive control module, so as to achieve closed-loop feedback control adjustment until Bluetooth data or audio is transmitted smoothly.

In an implementation manner of the embodiment of the present disclosure, the step that the target adjustment parameters are received and optimization adjustment is performed according to the target adjustment parameters until the Bluetooth performance of a terminal achieves an expected working state includes the sub-steps as follows.

At least one output result output by the application detection module, the channel detection module, the user interaction module and the body effect detection module is acquired, and if it is detected that Bluetooth lag or interruption is caused by inevitable signal interference near 2.4 GHz, the self-adaptive control module initiates a coexistence adjustment module.

The coexistence adjustment module determines the using situation of current other ISM band equipment according to a detection result of the application detection module, initiates narrowband filter and antenna passage adjustment of a corresponding band, and performs corresponding adjustment control on an own frequency hopping channel of Bluetooth, a maximum transmitting power and a working time slot, so as to reduce the coexistence influence.

A signal and audio value actually sampled by the Bluetooth chip and the baseband chip is compared with the power target value, and a comparison result is fed back to the self-adaptive control module, so as to achieve closed-loop feedback control adjustment until Bluetooth data or audio is transmitted smoothly.

The embodiments of the present disclosure are elaborated as follows with a real application scenario.

The present application scenario performs illustration with the following four factors influencing Bluetooth performance. The four factors influencing Bluetooth performance are as follows.

1. The influence of a maximum transmitting power supportable by Bluetooth on the performance of a transmission distance is large; in a traditional solution, due to limitations of a Bluetooth power class set by software, for example, a maximum transmitting power range of −6 dB to 4 dB under the limit of CLASS2, a software code default power is about 0 dB, and this transmitting power is fixed and cannot be adjusted; and in case of increase of the loss of a radio frequency front end or antenna sharing, attenuation of power from a Bluetooth chip to an antenna front end will be further increased, so the radiation power of Bluetooth will be greatly reduced. Therefore, a maximum linear transmission distance of Bluetooth is limited to be within a range of 10 m, and that is why Bluetooth transmission will be interrupted out of a range of 10 m or in the presence of an obstacle or a phenomenon of sound lag occurs.

2. An ISM band used by Bluetooth is a band open to all radio systems, a frequency range is 2402 to 2480 MHz, and Bluetooth will encounter various interference sources, so Bluetooth adopts a rapid packet acknowledgment technology and a frequency hopping solution to ensure stability of a link and a channel. There are 79 or 39 physical channels of Bluetooth generally, in a transmission process, random hopping is performed on these radio frequency channels via a pseudorandom sequence, and the sensitivity of each channel is different more or less, so if Bluetooth hops to a channel which has a weak signal or is prone to interference, the voice stability and transmission rate of a Bluetooth connecting terminal will be influenced.

3. When a Bluetooth earphone is connected to a mobile phone, if the mobile phone or the earphone is close to a body or a person is in a non-stationary state, such as walking, exercising and turning, due to the influence of antenna directionality, Bluetooth audio transmission may cause an obvious lag phenomenon. Meanwhile, due to a body effect, the Bluetooth earphone is put in a left ear or a right ear, the mobile phone is put on the same or opposite side of the body, and antenna gains and efficiency will be changed under the influence of body absorption, thereby influencing the quality of call voice or audio transmission. Therefore, how to reduce influence on a body caused by mobile phone Bluetooth in an application process and ensure smooth playing of wireless calls and audios without lags is a problem urgently to be solved by Bluetooth at present. At present, the problem is mainly solved by using a method for reducing quantity indexes of a head and hands, but the effect is not obvious.

4. When the Bluetooth of the mobile phone is used, an external WIFI and LTE signal stray interference within a same-frequency range exists or Bluetooth will cause an obvious lag phenomenon when an own WIFI and LTE of the mobile phone are initiated, thereby influencing the quality of call voice or audio transmission. How to smoothly use Bluetooth in the presence of adjacent channel interference or simultaneously initiate equipment within other ISM band ranges is also a problem urgently to be solved at present. At present, the current solutions reduce the influence by means of a software method, but the effect is not obvious.

The present application scenario adopts the embodiments of the present disclosure. Firstly, different from a single fixed-power Bluetooth transmitting mode, various application states and differentiated demands of a mobile phone are taken into full consideration, and Bluetooth transmission power and coverage range may be dynamically adjustable. Secondly, the present disclosure does not limit transmitting and receiving of a traditional random frequency-hopping mode, and achieves fixed selection and effective avoidance of a transmission channel, a modulation mode and a transmission rate by means of a wireless detection and analysis technology. Then, by monitoring a current body antenna effect and a motion mode state in real time, an antenna distribution and a directional diagram are switched and adjusted in all directions, and body attenuation efficiency is subjected to appropriate compensation and matching fine adjustment, so as to reduce the influence of a body effect. Finally, the coexistence influence of Bluetooth equipment in a using process is fully considered, the smoothness and preference rate of a Bluetooth channel are preferentially ensured by means of active and passive coexistence adjustment methods, and Bluetooth wireless connection and transmission are smooth without lags.

To sum up, the present application scenario can solve, by means of the embodiments of the present disclosure, bad influences caused by any one of the above factors, so as to adjust Bluetooth performance to achieve a good communication state, and is an intelligent, convenient and rapid mobile terminal Bluetooth performance self-adaptive adjustment solution, so that it can be ensured that different performances of a terminal can be adjusted in various application environments, communication states and individual requirements, mobile phone Bluetooth is always in an optimum working state, and a phenomenon of lag or interruption in a remote obstructed dynamic application environment is reduced. A communication terminal mainly includes the following contents.

The communication terminal includes: a baseband chip module, a Bluetooth chip module, a mobile phone Electrically Erasable Programmable Read-Only Memory (EEPROM) module, a Bluetooth antenna module, a self-adaptive control module, an application detection module, a channel detection module, a user interaction module, a body effect detection module, an antenna switching and adjustment module, a channel selection and avoidance module, a power adjustment module, and a coexistence adjustment module.

Herein, the application detection module is connected with the self-adaptive control module and the user interaction module, and is configured to detect various application scenarios of a current mobile phone user, and output a detection result to the self-adaptive control module, so as to achieve self-adaptive performance adjustment control.

The self-adaptive control module is connected with various application detection modules (such as the application detection module, the channel detection module, the user interaction module and the body effect detection module) and various adjustment modules (such as the antenna switching and adjustment module, the channel selection and avoidance module, the power adjustment module and the coexistence adjustment module), and is configured to make different optimization adjustment controls under different scenario states.

The power adjustment module is connected with the self-adaptive control module and the mobile phone EEPROM module, and is configured to achieve power digital type calling and multi-stage variable adjustment under different requirements in different application scenarios in conjunction with influence of a transmission distance, power consumption and body radiation.

The channel detection module is connected with the self-adaptive control module, and is configured to detect a channel quality state of current mobile phone Bluetooth and a channel occupancy situation within an external same-frequency and adjacent-frequency range, and output a detection result to the self-adaptive control module, so as to achieve corresponding channel avoidance and adjustment.

The channel selection and avoidance module is connected with the self-adaptive control module, and is configured to achieve selection and avoidance of a Bluetooth communication channel, and enable Bluetooth to be always on a small-interference and high-communication quality channel by means of a signal detection result and an anti-interference algorithm.

The body effect detection module is connected with the self-adaptive control module, and is configured to sense the influence on a body effect caused by a current mobile phone Bluetooth antenna, and transmit a detection result to the antenna switching and adjustment module.

The antenna switching and adjustment module is connected with the self-adaptive control module, and is configured to perform real-time switching and matching adjustment on a Bluetooth antenna to reduce a body antenna effect.

The coexistence adjustment module is connected with the self-adaptive control module, and is configured to optimize a coexistence performance between Bluetooth and other equipment according to a current application scenario and a user requirement, so as to preferentially ensure the communication quality of Bluetooth.

The user interaction module is connected with the baseband chip module and the self-adaptive control module, and is configured to receive an associated wireless setting and request of a user, and issue a control instruction to the self-adaptive control module, so as to achieve adjustment control.

The baseband chip module is connected with the self-adaptive control module and the Bluetooth chip module, and is configured to perform digital and audio processing on a Bluetooth signal.

The mobile phone EEPROM module is connected with the mobile phone Bluetooth chip module and each optimization adjustment module, so as to achieve storage of variable power calibration data, storage of wireless body model absorption ratio data, and storage of coexistence adjustment parameters.

The Bluetooth chip module is connected with each of the above modules, and is configured to transmit and receive a Bluetooth signal.

The Bluetooth antenna module is connected with the Bluetooth chip module, the self-adaptive control module and the antenna switching and adjustment module, and is configured to wirelessly transmit and receive a Bluetooth signal, receive instructions of the self-adaptive control module and the antenna switching and adjustment module, and switch antenna mode and matching.

The above self-adaptive performance adjustment circuit and process are specifically elaborated below with FIG. 1 and FIG. 2.

Application Example One

Figure 1:
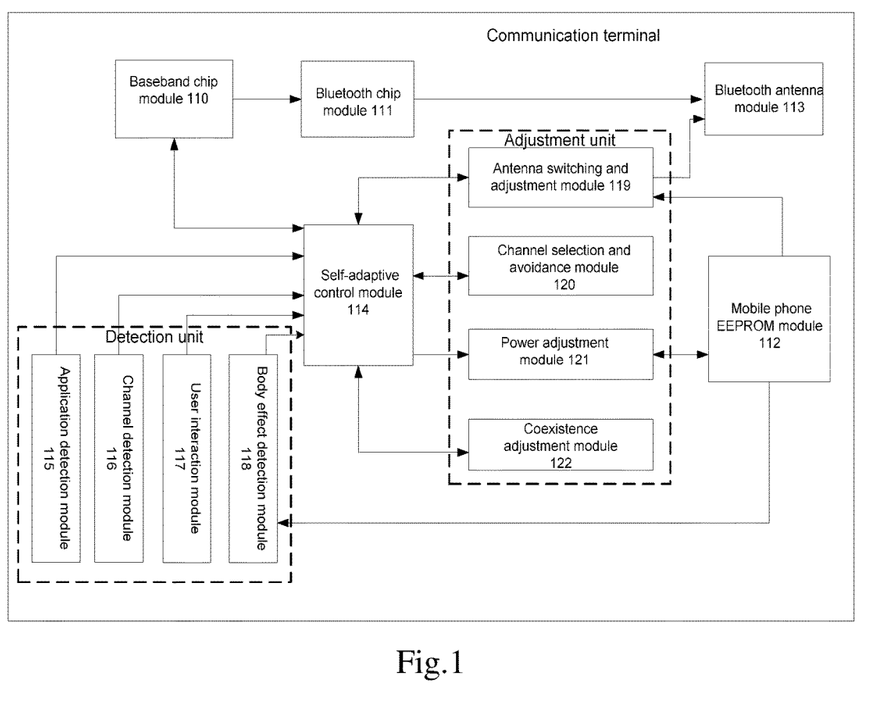
FIG. 1 is a structure diagram of a hardware example of a self-adaptive Bluetooth performance adjustment communication terminal according to an embodiment of the present disclosure.

FIG. 1 is a structure diagram of a hardware example of a self-adaptive Bluetooth performance adjustment communication terminal according to an embodiment of the present disclosure. As shown in FIG. 1, the Bluetooth performance adjustment communication terminal includes: a baseband chip module 110, a Bluetooth chip module 111, a mobile phone EEPROM module 112, a Bluetooth antenna module 113, a self-adaptive control module 114, an application detection module 115, a channel detection module 116, a user interaction module 117, a body effect detection module 118, an antenna switching and adjustment module 119, a channel selection and avoidance module 120, a power adjustment module 121, and a coexistence adjustment module 122, the application detection module 115, the channel detection module 116, the user interaction module 117 and the body effect detection module 118 form a detection unit in the above embodiment; the antenna switching and adjustment module 119, the channel selection and avoidance module 120, the power adjustment module 121 and the coexistence adjustment module 122 form an adjustment unit in the above embodiment; and the self-adaptive control module 114 is a self-adaptive control unit in the above embodiment.

The application detection module is connected with the self-adaptive control module, and is configured to detect various application scenarios of current mobile phone Bluetooth and a user requirement, and output a detection result to the self-adaptive control module, so as to achieve self-adaptive performance adjustment control. Here, the application detection module mainly completes detection of a mobile phone wireless communication system and mode to judge, for example, whether WIFI is initiated and whether LTE adjacent bands are in use. Meanwhile, it is detected whether a mode requirement of a mobile phone user is data service transmission, wireless Bluetooth call or wireless audio playing. The application detection module transmits the detection result to each control adjustment module, so as to achieve wireless control modulation of Bluetooth.

The self-adaptive control module is connected with the application detection module and each control adjustment module, and is configured to make different adjustment response controls on adjustment states under different Bluetooth scenario states. The module detects an application state and performance quality of current Bluetooth in real time, adjusts associated parameters of mobile phone Bluetooth in real time according to a user requirement and a detection result, and initiates each corresponding control adjustment optimization module, so as to achieve closed-loop control until Bluetooth performance is optimized.

The power adjustment module is connected with the self-adaptive control module and the mobile phone EEPROM module, and is configured to achieve power digital type calling and multi-stage variable adjustment under different requirements in different application scenarios in conjunction with influence of a transmission distance, power consumption and body radiation. Multiple power control files are disposed in the module, corresponding power output classes such as CLASS1, CLASS1.5, CLASS2 and CLASS3 are adopted by means of detected signal and audio quality, and information requirements such as an SAR value requirement set by a user and an energy saving mode requirement, and corresponding maximum average target power value start parameters are called under the corresponding power classes. In the working process of Bluetooth, maximum output power classes of various debugging modes such as GFSK, DQPSK and 8 DPSK are adjusted, transmitting power is divided into a coarse adjustment form and a fine adjustment form according to transmission signal quality, coarse adjustment is stepped to 4 DB, fine adjustment is stepped to 1 DB, parameters and instructions to be adjusted are stored in the mobile phone EEPROM module, and can be called by the power adjustment module according to a detection result.

The channel detection module is connected with the self-adaptive control module, and is configured to detect a channel quality state of current mobile phone Bluetooth and a channel occupancy situation within an external same-frequency and adjacent-frequency range, and output a detection result to the self-adaptive control module, so as to achieve corresponding channel avoidance and adjustment. The signal detection module will detect four aspects. Firstly, the occupancy situations of 79 channels of Bluetooth within a frequency range of 2402 MHz to 2480 MHz are checked by frequency sweeping. Secondly, the occupancy situations of 14 channels of WIFI within a frequency range of 2412 MHz to 2484 MHz will be scanned. Then, the occupancy situations of transmitting channels of LTE within a frequency range of 2300 MHz to 2500 MHz such as the occupancy situations of channels within a band range of LTE B7, B40 and B41 will be scanned. Finally, the occupancy situations of channels of Bluetooth within other adjacent band ranges are scanned. By means of statistic analysis of distribution diagrams occupied by channel resources and each Received Signal Strength Indication (RSSI), a result thereof is output to the channel selection and avoidance module for further processing.

The channel selection and avoidance module is connected with the self-adaptive control module, and is configured to achieve selection and avoidance of a Bluetooth communication channel, and enable Bluetooth to be always on a small-interference and high-communication quality channel by means of a signal detection result and an anti-interference algorithm. A channel selection rule is: analyzing, according to a statistical result of the above channel detection module, the occupancy situation of a signal band on the whole ISM band, and limiting a frequency hopping channel of Bluetooth within a small-interference band range, if random frequency hopping can be performed in 1 to 79 channels and it is discovered that other wireless interference bands exist in channels No. 1 to 38 by current detection, Bluetooth channel frequency hopping is limited in channels No. 39 to 79. Meanwhile, channel selection also needs to consider the own sensitivity characteristic, transmitting power and other modulation characteristics of each channel of Bluetooth, a transmission channel with high channel quality is preferentially used, preferential transmission is performed on a channel with a low minimum input level, a high maximum transmitting power and a good modulation coefficient, and even transmitting and receiving can be fixedly performed on a certain channel with best radio frequency characteristics. Finally, if it is discovered that one or more channels have same-frequency or adjacent-frequency large radiation interference, a channel avoidance mechanism is initiated, interference channel transmission is skipped during poll frequency hopping, same-frequency channels are avoided first during avoidance, and then adjacent channel stray response points of 1 M, 2M and 3 MHz are avoided. If interference is full-band coverage, a Bluetooth frequency hopping channel is fixed on a band with fewest stray response points. The avoidance rule is: the same frequency is preferred, and then a large-interference signal is preferred. For example, interference of −27 DB is much larger than interference of −50 DM, and an adjacent channel is preferred. Moreover, a WIFI main channel and an adjacent LTE band and channel are avoided first during Bluetooth frequency hopping avoidance.

The body effect detection module is connected with the application detection module, the self-adaptive control module and the mobile phone EEPROM module, and is configured to sense the influence on a body effect caused by a current mobile phone Bluetooth antenna, and transmit a detection result to the antenna switching and adjustment module. In a using process of mobile phone Bluetooth, under the action of an own antenna effect of a body within a region of an antenna near-magnetic field, antenna radiation characteristics will be greatly influenced. During design and optimization of an antenna, the efficiency of a free space is usually taken into consideration, so only the TRP and TIS values of the free space are tested. The influences of a head and hands will be taken into consideration for part of mobile phones. However, a body model is simple and not representative, and an OTA test index will adopt a threshold reducing method to avoid the influences. Meanwhile, when a Bluetooth signal is transmitted between a Bluetooth earphone and a mobile phone cross the air, one or more bodies will be often penetrated. At this time, under the influence of a body effect and the influence of multi-path attenuation of an obstructed electromagnetic wave, the efficiency of an electromagnetic wave antenna will be greatly reduced. Since the body influences the directional diagram and efficiency of a mobile phone Bluetooth antenna, the body effect detection module is needed to detect and evaluate the influence in real time.

In the body effect detection module, the body is divided into a head, hands, a chest, arms and a haunch during pre-design, and each part is divided into a left half part and a right half part such as a left half waist and a right half waist, so there are ten body models totally. Moreover, a directional diagram and an efficiency reduction value generated by a band corresponding to each body model are stored in a mobile phone EEPROM, and meanwhile, a spherical directional diagram and antenna efficiency of a free space without body influence are stored in a mobile phone EEPROM parameter file to serve as a target directional diagram and efficiency value. For example, a mobile phone is put into a left pocket, compared with a free space state, a directional diagram of a Bluetooth antenna is no longer in horizontally or vertically polar symmetry, and meanwhile, the maximum radiation power is reduced by 4 DB and the antenna efficiency is reduced by 60%. Associated theoretical model information is preset in advance, when the body effect detection module detects associated data, a current location of a mobile phone relative to a body and an influence amount can be estimated, and then corresponding repair adjustment is made.

The body effect detection module will detect influence situations under a static mode and a dynamic mode. When a mobile phone detects that Bluetooth equipment is close to related parts of a body in a relative rest state, if a phenomenon of call or audio lag occurs, the body effect detection module compares a preset electromagnetic save absorption model value with a current test value, and calculates an attenuation value of contact between the mobile phone and the body part. If there is a large attenuation, it is shown that the directionality of a Bluetooth antenna has a problem of equilibrium, is greatly influenced by body absorption or is shift in central frequency, so it is necessary to initiate the antenna switching and adjustment module, so as to reduce the body influence.

When the mobile phone detects that Bluetooth equipment moves relative to the body, for example, a person turns, walks, shakes, jumps or swims, the application detection module will receive a rate, acceleration and angular acceleration information transmitted back from a mobile phone acceleration sensor or gyroscope. During the movement process of the body in a radio wave space, since the body and a building are radiators of an electromagnetic wave signal, the transmitting power and the receiving power have multi-path propagation attenuation to a certain extent. The body effect records a space wireless average power loss value, then tests the penetration power or RSSI attenuation amount of one or more bodies, and stores it in parameters corresponding to the mobile phone EEPROM. Under each motion mode, a group of specific average attenuation values will be obtained, and the body effect detection module will add a dynamic delay value to a current attenuation value, and feed a result back to the self-adaptive control module to perform real-time adjustment control.

The antenna switching and adjustment module is connected with the self-adaptive control module and the Bluetooth antenna module, and is configured to perform real-time switching and matching adjustment on a Bluetooth antenna to reduce a body antenna effect. The antenna switching module judges, according to an output result of the body effect detection module, a current antenna contact location and attenuation amount, and switches the Bluetooth antenna to a location away from a body contact part. In this structure, a mobile phone needs to be internally provided with two to four groups of Bluetooth antennae that are gated by a switch. Meanwhile, each antenna branch achieves fine adjustment on standing wave and directionality by matching fine adjustment. The matching fine adjustment here may be implemented by matching array switch gating, or may be implemented by an MEMS variable resistance-capacitance device.

The coexistence adjustment module is connected with the application detection module and the self-adaptive control module, and is configured to adjust a working mechanism of coexistence equipment associated with Bluetooth according to a current application scenario and a user requirement, so as to preferentially ensure the communication quality of Bluetooth. The coexistence adjustment module determines, according to a detection result of the application detection module, currently-used associated equipment such as WIFI, LTE, other BT equipment and other ISM band equipment. If there is an overlap within a band range, the working of Bluetooth equipment will be interfered and influenced. At this time, the self-adaptive control module initiates a coexistence adjustment function, and makes corresponding adjustment control on an own frequency hopping channel of Bluetooth, a maximum transmitting power, a working time slot and an antenna branch, to make it work near the frequency away from coexistence equipment, and to improve the own transmitting power so as to reduce the influence of an interference level. During allocation of the working time slot, the time slot duty ratio and time slot quantity of WIFI are increased, and finally, an antenna branch with high space isolation and small association coefficient is selected to serve as a Bluetooth transmitting and receiving antenna. Corresponding balance adjustment is made on the maximum transmitting power of the own coexistence equipment, a working channel and the working time slot.

In addition, the coexistence adjustment module achieves filtering of adjacent bands by means of an in-built narrow-band filter group and a control switch. When the application detection module detects the appearance of adjacent coexistence bands such as LTE B7, B38, B40 and B41, the coexistence adjustment module will control the switch to gate a narrowband filter of a corresponding band, so as to reduce the transmitting leakage interference of adjacent frequencies.

The user interaction module is connected with the baseband chip module and the self-adaptive control module, and is configured to receive an associated wireless setting and request of a user, and issue a control instruction to the self-adaptive control module, so as to achieve adjustment control. The user interaction module adds a UI to a mobile phone, a user can set a wireless signal coverage class of a Bluetooth signal, an electromagnetic wave radiation threshold class, ON or OFF of a power-saving mode, selection of a motion mode, weakening enabling of a body effect, selection of a coexistence preference grade and the like, and the self-adaptive control module initiates the corresponding adjustment module by setting a user interaction mode, so as to obtain a corresponding function state.

The baseband chip module is connected with the self-adaptive control module and the Bluetooth chip module, and is configured to perform digital and audio processing on a Bluetooth signal and detect a current mobile phone wireless signal amplitude RSSI value. RSSI mainly monitors BT, WIFI and LTE signal strength, and a baseband judgment chip receives link quality, signal strength and stability, feeds back to the self-adaptive control module via the magnitude of signal amplitude, and performs self-adaptive adjustment on Bluetooth performance.

The mobile phone EEPROM module is connected with the mobile phone Bluetooth chip module and each optimization adjustment module to achieve storage of variable power calibration data, storage of wireless body model absorption ratio data and storage of coexistence adjustment parameters and information, and writes the adjusted parameters into a mobile phone corresponding file for real-time calling.

The Bluetooth chip module is connected with the self-adaptive control module and the baseband chip module, and is configured to demodulate a signal received from a Bluetooth antenna, convert the signal to a corresponding digital audio signal, transmit the signal to a baseband chip for further digital processing, modulate, amplify and filter the digital or audio signal, and then transmit the signal via a radio frequency antenna.

The Bluetooth antenna module is connected with the Bluetooth chip module, the self-adaptive control module and the antenna switching and adjustment module, and is configured to wirelessly transmit and receive a Bluetooth signal, receive instructions of the self-adaptive control module and the antenna switching and adjustment module, and switch antenna mode and matching. The Bluetooth antenna module consists of all Bluetooth parasitic antennae and variable matching distributed around a mobile phone. When a Bluetooth chip works, the self-adaptive control module controls, according to settings of the user interaction module and a detection result of the body effect detection module, the antenna switching and adjustment module to display antenna gating of different directional diagrams and body models, gates a specific antenna, and then performs matching fine adjustment according to a Bluetooth transmission effect, so as to further improve the antenna efficiency and the body influence.

Application Example Two

Figure 2:
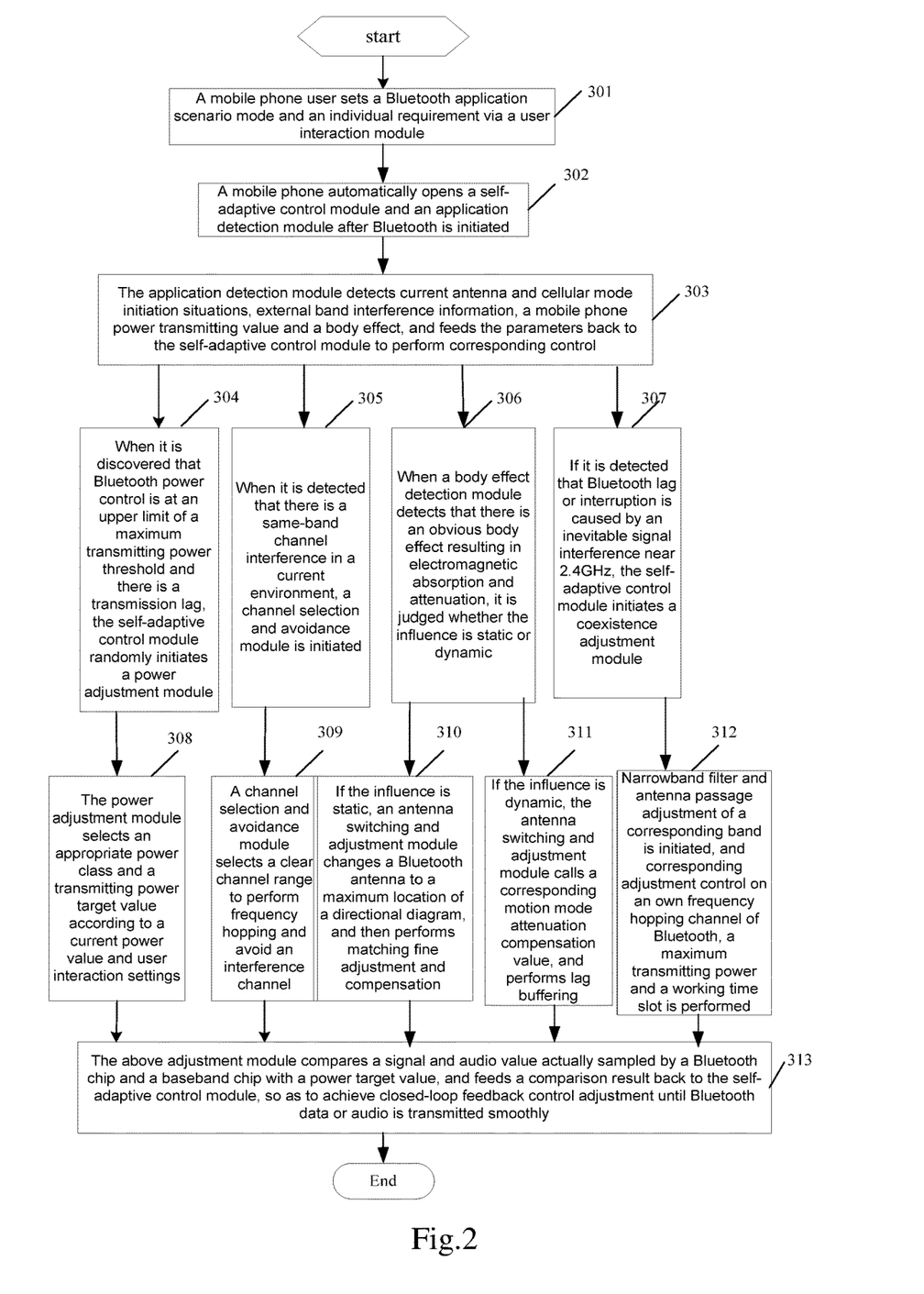
FIG. 2 is a flowchart of a Bluetooth self-adaptive performance adjustment process of a communication terminal according to an embodiment of the present disclosure.

FIG. 2 is a flowchart of Bluetooth self-adaptive performance adjustment of a communication terminal according to the present disclosure. As shown in FIG. 2, a method for the mobile terminal in the present disclosure includes the steps as follows.

In step 301, a mobile phone user sets a Bluetooth application scenario mode and an individual requirement via a user interaction module.

In step 302, a mobile phone automatically opens a self-adaptive control module and an application detection module after Bluetooth is initiated.

In step 303, the application detection module detects parameters such as current antenna and cellular mode initiation situations, external band interference information, a mobile phone power transmitting value, RSSI information and body magnetic field absorption information, and feeds the parameters back to the self-adaptive control module to perform corresponding feedback control.

In step 304, when it is discovered that Bluetooth power control is at an upper limit of a maximum transmitting power threshold and there is a transmission lag, the self-adaptive control module randomly initiates a power adjustment module, then, step 308 is executed, and the transmission power is increased until the lag disappears.

In step 305, when it is detected that there is a co-channel interference in a current environment, a channel selection and avoidance module is initiated, then, step 309 is executed, a clear channel range is selected for frequency hopping, and an interference channel is avoided.

In step 306, when a body effect detection module detects that there is an obvious body effect resulting in electromagnetic absorption and attenuation, it is judged whether the influence is static or dynamic, if the influence is static, step 310 is executed, and if the influence is dynamic, step 311 is executed.

In step 307, if it is detected that Bluetooth lag or interruption is caused by an inevitable signal interference near 2.4 GHz, the self-adaptive control module initiates a coexistence adjustment module, and step 312 is executed.

In step 308, the power adjustment module selects an appropriate power class and a transmitting power target value according to a current power value and user interaction settings, and then step 313 is executed.

In step 309, a channel selection and avoidance module selects a clear channel range to perform frequency hopping and avoid an interference channel, and then step 313 is executed.

In step 310, if the influence is static, the self-adaptive control module controls an antenna switching and adjustment module to switch a Bluetooth antenna to a location away from a body contact part, and then performs real-time matching fine adjustment and same-amplitude attenuated power compensation, and then step 313 is executed.

In step 311, if the influence is dynamic, the self-adaptive control module calls a mean power attenuation value under a corresponding motion form to perform same-amplitude attenuation compensation, and controls a delay buffer module to buffer and smooth a transmission signal, so as to prevent lag, and then step 313 is executed.

In step 312, a coexistence adjustment module determines the using situation of current other ISM band equipment according to a detection result of the application detection module, initiates narrowband filter and antenna passage adjustment of a corresponding band, and performs corresponding adjustment control on an own frequency hopping channel of Bluetooth, a maximum transmitting power and a working time slot, so as to reduce the coexistence influence, and then step 313 is executed.

In step 313, the above adjustment module compares a signal and audio value actually sampled by a Bluetooth chip and a baseband chip with a power target value, and feeds a comparison result back to the self-adaptive control module, so as to achieve closed-loop feedback control adjustment until Bluetooth data or audio is transmitted smoothly.

To sum up, the above two application examples 1 and 2 adopt the embodiments of the present disclosure to achieve the beneficial effects as follows.

By means of power self-adaptive controllable adjustment, a maximum transmitting power supportable by Bluetooth is changed from the source, Bluetooth can be hopped within a smallest-interference channel range by means of a channel selection and avoidance method, a body effect detection module detects the absorption situation of a body to an antenna to adjust antenna direction and matching, a coexistence adjustment module improves the anti-interference capability and time slot duty ratio of Bluetooth, and by means of the above four-in-one comprehensive adjustment method, the Bluetooth performance of a mobile phone can be self-adaptively adjusted according to a user requirement and an application scenario, so as to prevent Bluetooth data transmission interruption and lag under a complex application scenario.

If being implemented in a form of software function module and sold or used as an independent product, the above-mentioned integrated module in the embodiments of the present disclosure may also be stored in a computer-readable storage medium. Based on such understanding, the technical solutions of the embodiments of the present disclosure substantially or parts making contributions to the conventional art may be embodied in form of software product, and the computer software product is stored in a storage medium, including a plurality of instructions used to enable computer equipment (which may be a personal computer, a server, network equipment or the like) to execute all or part of the method in each embodiment of the present disclosure. The above-mentioned storage medium includes: various media capable of storing program codes such as a U disk, a mobile hard disk, a Read-Only Memory (ROM), a Random Access Memory (RAM), a magnetic disk or an optical disk. Thus, the embodiment of the present disclosure is not limited to combination of any specific hardware and software.

Correspondingly, the embodiment of the present disclosure also provides a computer storage medium in which a computer program is stored, the computer program being used to execute the self-adaptive Bluetooth performance adjustment communication method in the embodiment of the present disclosure.

The above is only the preferable embodiments of the present disclosure, and not intended to limit the scope of protection of the present disclosure.

INDUSTRIAL APPLICABILITY

By means of the embodiments of the prevent disclosure, state parameters in various Bluetooth application environments of a current terminal user, when turning on Bluetooth communication transmission, and a target requirement of the current terminal user are obtained via a detection unit, and a self-adaptive control unit receives the state parameters in various Bluetooth application environments and the target requirement of the current terminal user, and controls an adjustment unit to perform adjustment, such that the adjustment unit performs optimization adjustment according to received target adjustment parameters until the Bluetooth performance of a terminal achieves an expected working state. Bad influences caused by any one of the above factors can be avoided, so as to adjust Bluetooth performance to achieve a good communication state.

What is claimed is:

1. A self-adaptive Bluetooth performance adjustment communication terminal, comprising:
    a detection unit, configured to, when a Bluetooth communication transmission is turned on, detect state parameters in various Bluetooth application environments of a current terminal user and a target requirement of the current terminal user, and obtain a detection result and send the detection result to a self-adaptive control unit;
    the self-adaptive control unit, configured to receive and analyze the detection result to obtain the state parameters and the target requirement, obtain, according to the state parameters and the target requirement, target adjustment parameters corresponding to associated Bluetooth parameters expected to be adjusted, control initiation of an adjustment unit, and send, according to a first preset rule, the target adjustment parameters to the adjustment unit for processing; and
    the adjustment unit, configured to receive the target adjustment parameters, and perform, according to the target adjustment parameters, optimization adjustment until the Bluetooth performance of a terminal reaches an expected working state;
    wherein the detection unit further comprises:
    a channel detection module, configured to detect a channel quality state of current terminal Bluetooth and a channel occupancy situation within an external same-frequency and adjacent-frequency range, send an obtained detection result to the self-adaptive control unit, and then provide the detection result for a corresponding adjustment module to realize corresponding adjustment, so as to obtain a corresponding channel avoidance result;
    a user interaction module, configured to receive an associated wireless setting and request of a user, support the user to set a mode corresponding to the Bluetooth application environment and the target requirement of a current terminal user to generate a control instruction, send the control instruction to the self-adaptive control unit, and then provide the control instruction for a corresponding adjustment module to realize corresponding adjustment, so as to obtain a corresponding expected working state.

2. The communication terminal as claimed in claim 1, wherein the expected working state is used for representing: supporting the terminal to enable the Bluetooth communication transmission to be always in an optimum working state in various application environments, communication states and user individual requirements via different performance adjustments, so as to reduce a phenomenon of lag or interruption in a remote obstructed dynamic application environment.

3. The communication terminal as claimed in claim 2, wherein the adjustment unit further comprises:
    an antenna switching and adjustment module, configured to acquire at least one output result output by the application detection module, the channel detection module, the user interaction module and the body effect detection module, perform, when acquiring a sensing result output by the body effect detection module, real-time switching and matching adjustment by judging a current antenna contact location and attenuation according to the sensing result to reduce a body antenna effect, and switch a Bluetooth antenna to a location away from a body contact part.

4. The communication terminal as claimed in claim 2, wherein the adjustment unit further comprises:
    a power adjustment module, configured to acquire at least one output result output by the application detection module, the channel detection module, the user interaction module and the body effect detection module, and achieve power digital type calling and multi-stage variable adjustment under different requirements in various Bluetooth application environments in conjunction with influence of three indexes namely transmission distance, power consumption and body radiation.

5. The communication terminal as claimed in claim 2, wherein the adjustment unit further comprises:
    a channel selection and avoidance module, configured to acquire at least one output result output by the application detection module, the channel detection module, the user interaction module and the body effect detection module, and achieve, when acquiring a detection result output by the channel detection module, selection and avoidance of a Bluetooth communication channel according to the detection result and an anti-interference algorithm, such that Bluetooth communication transmission is always performed on a small-interference and high-communication quality channel.

6. The communication terminal as claimed in claim 2, wherein the adjustment unit further comprises:
a coexistence adjustment module, configured to acquire at least one output result output by the application detection module, the channel detection module, the user interaction module and the body effect detection module, and optimize a coexistence performance between Bluetooth and other equipment according to a current Bluetooth application scenario and the target requirement, so as to preferentially ensure the communication quality of Bluetooth.

7. The communication terminal as claimed in claim 2, wherein the adjustment unit further comprises:
an antenna switching and adjustment module, configured to acquire at least one output result output by the application detection module, the channel detection module, the user interaction module and the body effect detection module, perform, when acquiring a sensing result output by the body effect detection module, real-time switching and matching adjustment by judging a current antenna contact location and attenuation according to the sensing result to reduce a body antenna effect, and switch a Bluetooth antenna to a location away from a body contact part.

8. The communication terminal as claimed in claim 1, wherein the detection unit further comprises:
an application detection module, configured to detect a Bluetooth application environment of the current terminal user, complete detection on requirements for a terminal wireless communication system, a communication mode and a terminal user mode, send an obtained detection result to the self-adaptive control unit, and then provide the detection result for a corresponding adjustment module to realize corresponding adjustment, so as to obtain a corresponding channel avoidance result.

9. The communication terminal as claimed in claim 8, wherein the adjustment unit further comprises:
a power adjustment module, configured to acquire at least one output result output by the application detection module, the channel detection module, the user interaction module and the body effect detection module, and achieve power digital type calling and multi-stage variable adjustment under different requirements in various Bluetooth application environments in conjunction with influence of three indexes namely transmission distance, power consumption and body radiation.

10. The communication terminal as claimed in claim 8, wherein the adjustment unit further comprises:
a channel selection and avoidance module, configured to acquire at least one output result output by the application detection module, the channel detection module, the user interaction module and the body effect detection module, and achieve, when acquiring a detection result output by the channel detection module, selection and avoidance of a Bluetooth communication channel according to the detection result and an anti-interference algorithm, such that Bluetooth communication transmission is always performed on a small-interference and high-communication quality channel.

11. The communication terminal as claimed in claim 1, wherein the detection unit further comprises:
a body effect detection module, configured to sense the influence on a body effect caused by a current terminal Bluetooth antenna, send an obtained sensing result to the self-adaptive control unit, and then provide the sensing result for a corresponding adjustment module to realize corresponding adjustment, so as to obtain a result of reducing the influence on the body effect.

* * * * *